United States Patent
Kobayashi

(10) Patent No.: US 10,544,005 B2
(45) Date of Patent: Jan. 28, 2020

(54) FILAMENT WINDING DEVICE

(71) Applicant: TOYOTA JIDOSHA KABUSHIKI KAISHA, Toyota-shi, Aichi-ken (JP)

(72) Inventor: Tomoyoshi Kobayashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/181,701

(22) Filed: Nov. 6, 2018

(65) Prior Publication Data
US 2019/0168989 A1  Jun. 6, 2019

(30) Foreign Application Priority Data
Dec. 6, 2017  (JP) .................. 2017-234580

(51) Int. Cl.
*B65H 54/00* (2006.01)
*B65H 54/44* (2006.01)
*B65H 54/06* (2006.01)

(52) U.S. Cl.
CPC ............. *B65H 54/44* (2013.01); *B65H 54/06* (2013.01)

(58) Field of Classification Search
CPC ........ B65H 54/08; B65H 54/14; B65H 54/44; B65H 81/04; B65H 81/08; B29C 70/32; B29C 53/562; B29C 53/602; B29C 53/665; H01F 41/071; H01F 41/08
See application file for complete search history.

(56) References Cited

U.S. PATENT DOCUMENTS

| | | | | |
|---|---|---|---|---|
| 6,613,253 B1* | 9/2003 | Negishi | ................ | B26D 1/0006 264/345 |
| 2002/0079400 A1* | 6/2002 | Fujiwara | ................ | B65H 18/10 242/523.1 |
| 2010/0243788 A1* | 9/2010 | Oku | ..................... | B65H 23/038 242/525 |
| 2013/0256447 A1* | 10/2013 | Tanigawa | ............... | B29C 53/602 242/419.1 |
| 2015/0266232 A1* | 9/2015 | Tanigawa | ............... | B29C 53/602 242/419.1 |
| 2015/0283753 A1* | 10/2015 | Hatta | .................... | B29C 53/562 156/475 |

(Continued)

FOREIGN PATENT DOCUMENTS

JP  2014-233852  12/2014
JP  2018-158562  10/2018

*Primary Examiner* — Emmanuel M Marcelo
(74) *Attorney, Agent, or Firm* — Finnegan, Henderson, Farabow, Garrett & Dunner, LLP

(57) ABSTRACT

A filament winding device includes a controller configured to control a rotating unit, a first moving unit, a second moving unit, and a swing unit based on command values of a rotation angle of a liner, and a first position, a second position, and a swing angle of a guide roller. The controller includes an associating unit configured to associate measured values of the first position, the second position, and the swing angle of the guide roller, corresponding to each rotation angle of the liner, with a measured value of the rotation angle of the liner, a difference calculating unit configured to calculate differences between the command values and the measured values, and a speed lowering unit configured to, when any one of the differences exceeds a predetermined threshold, lower a winding speed of the fiber bundle on the liner.

2 Claims, 9 Drawing Sheets

(56) References Cited

U.S. PATENT DOCUMENTS

2016/0264375 A1* 9/2016 Hatta ................ B29C 70/32
2016/0368232 A1* 12/2016 Araki ................ B29D 30/16
2018/0236735 A1* 8/2018 Nishibu ............. B29C 53/665

* cited by examiner

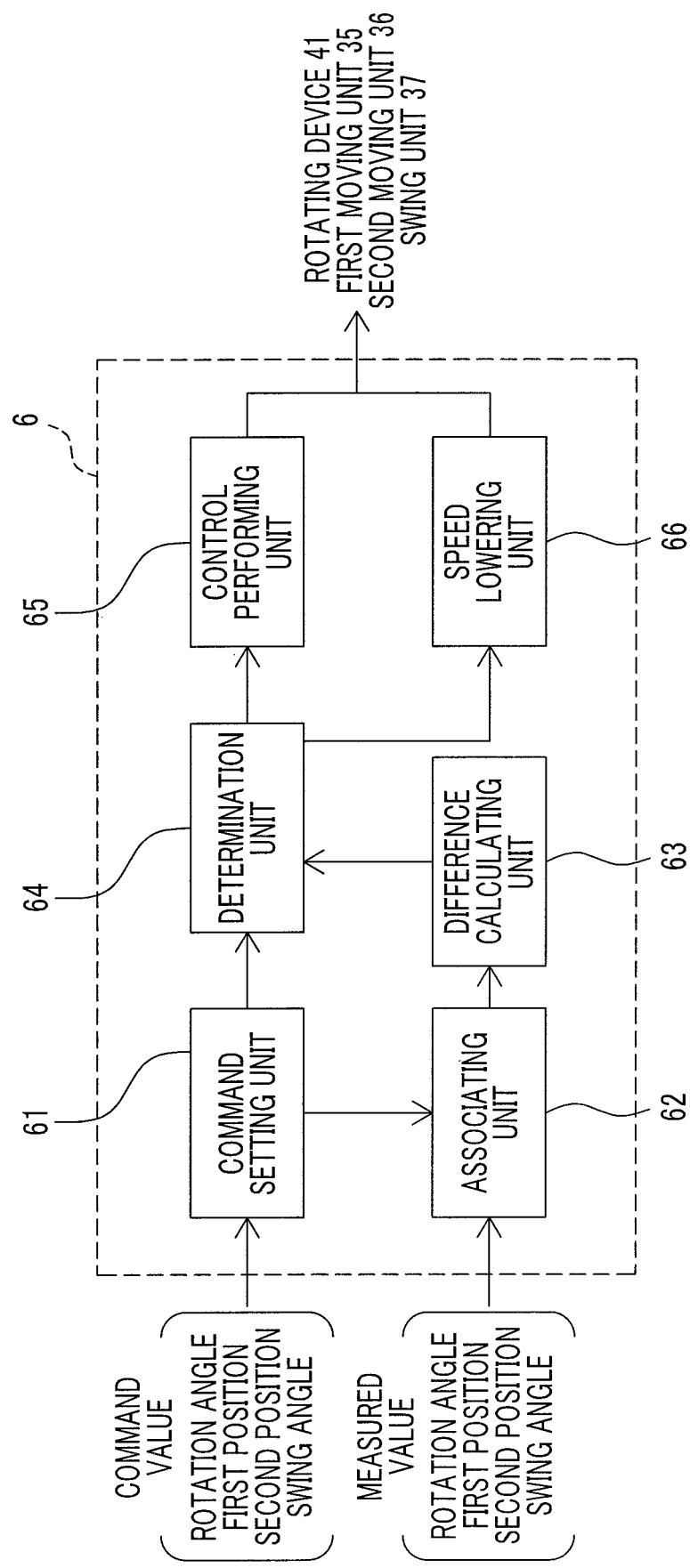

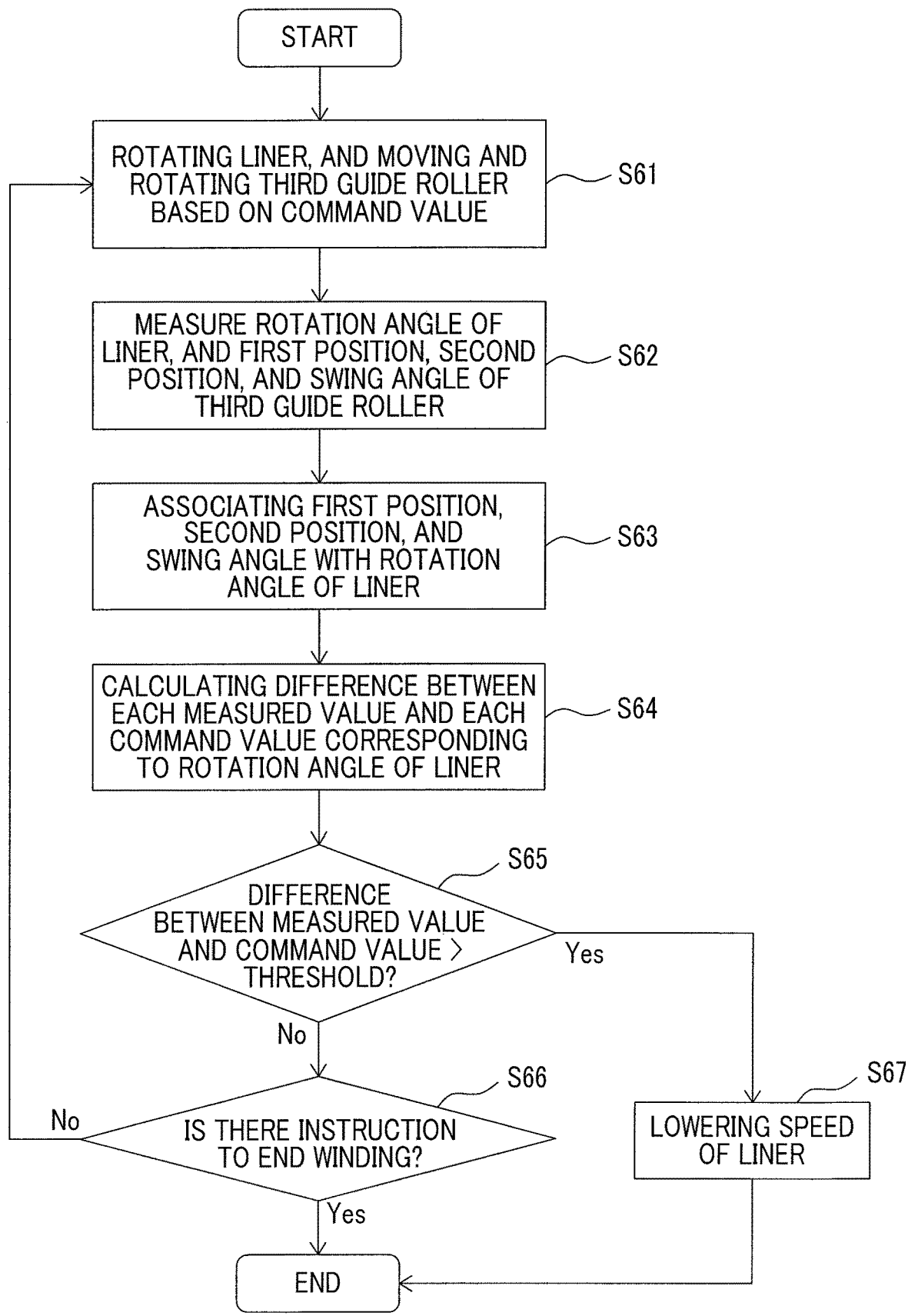

FILAMENT WINDING DEVICE

INCORPORATION BY REFERENCE

The disclosure of Japanese Patent Application No. 2017-234580 filed on Dec. 6, 2017 including the specification, drawings and abstract is incorporated herein by reference in its entirety.

BACKGROUND

1. Technical Field

The disclosure relates to a filament winding device.

2. Description of Related Art

As a device for manufacturing a tank storing high pressure fluid, a filament winding device (hereinafter, referred to as "FW device") is used (see, for example, Japanese Unexamined Patent Application Publication No. 2014-233852 (JP 2014-233852 A)). The FW device is a device for winding a fiber bundle made of reinforcing fiber impregnated with an uncured thermosetting resin around a liner constituting a tank with a predetermined tension. The use of the FW device makes it possible to form a high strength fiber reinforced resin layer on the liner.

When the FW device is used in manufacturing the tank, in order to impart a desired strength to the tank, a fiber bundle is needed to be appropriately wound around the liner. In JP 2014-233852 A, in order to ascertain the winding position of the fiber bundle, the winding position and a turning diameter of the fiber bundle are checked at a dome portion constituting the liner.

SUMMARY

However, in the FW device disclosed in JP 2014-233852 A, the winding position and the turning diameter of the fiber bundle are checked after the winding of the fiber bundle has been completed, and a determination whether the fiber bundle is at an appropriate position is not made while the fiber bundle is being wound around the liner. That is, in the FW device, the determination of the inappropriate winding position of the fiber bundle has to be made after the winding of the fiber bundle has been completed.

The disclosure provides a filament winding device capable of suppressing winding of a fiber bundle at an inappropriate position on a liner in advance when the fiber bundle is being wound around the liner.

First and second aspects of the disclosure relate to a filament winding device. The filament winding device is a device that winds a fiber bundle around a liner including a cylindrical body portion and a pair of dome-shaped end portions formed at both sides of the body portion. The filament winding device includes a rotating unit configured to rotate the liner about a central axis of the liner, a guide roller configured to guide the fiber bundle wound around the liner, a first moving unit configured to move the guide roller in an axial direction of the liner, a second moving unit configured to move the guide roller in a radial direction of the liner, a swing unit configured to rotate the guide roller such that a central axis of the guide roller swings, a rotation angle measuring unit configured to measure a rotation angle of the liner, a first measuring unit configured to measure a first position of the guide roller in the axial direction, a second measuring unit configured to measure a second position of the guide roller in the radial direction, a swing angle measuring unit configured to measure a swing angle of the guide roller, and a controller configured to control the rotating unit, the first moving unit, the second moving unit, and the swing unit, based on each of command values of the rotation angle of the liner, and the first position, the second position, and the swing angle of the guide roller. The command values are set depending on an elapsed time from the start of the winding of the fiber bundle.

In the filament winding device according to the first and second aspects of the disclosure, the controller is configured to include an associating unit configured to associate measured values of the first position, the second position, and the swing angle of the guide roller, corresponding to each rotation angle of the liner, with a measured value of the rotation angle of the liner, and a difference calculating unit configured to calculate differences between the command values of the first position, the second position, and the swing angle of the guide roller and the measured values of the first position, the second position, and the swing angle of the guide roller corresponding to the rotation angle of the liner, based on the measured values of the guide roller associated with the rotation angle of the liner and the command values of the guide roller, corresponding to each command value of the rotation angle of the liner.

In the first aspect of the disclosure, in addition to the above-mentioned configuration, the controller is configured to include a speed lowering unit configured to, when any one of the differences exceeds a predetermined threshold, lower a winding speed of the fiber bundle on the liner by lowering a rotational speed of the liner by the rotating unit, a moving speed of the guide roller by the first moving unit and the second moving unit, and a rotational speed of the guide roller by the swing unit.

In the second aspect of the disclosure, in addition to the above-mentioned configuration, the controller is configured to include an offset time calculating unit configured to, when any one of the differences exceeds a predetermined threshold, calculate an offset time with respect to the command values of the rotational angle of the liner, the first position, the second position, and the swing angle of the guide roller, based on the difference exceeding the threshold, and a correcting unit configured to correct the command values that are set depending on an elapsed time since a point in time when the difference exceeds the threshold, to the command values that are set after the offset time, and the controller is configured to perform the control based on the command values after correcting the command values.

According to the first and second aspects of the disclosure, based on the command value that is set depending on the elapsed time from the start of the winding of the fiber bundle, the controller can control the rotation angle of the liner, and the first position, the second position, and the swing angle of the guide roller, thereby controlling the winding of the fiber bundle on the liner.

Here, in the first and second aspects of the disclosure, the difference calculating unit may calculate the difference between the measured values and the command values of the first position, the second position, and the swing angle of the guide roller, from the measured values and the command values of the guide roller, corresponding to each rotation angle of the liner. The calculated difference is a parameter for determining whether or not the first position, the second position, or the swing angle of the guide roller are at appropriate positions or angles with respect to the rotation angle of the liner.

Therefore, when any one of the differences between the measured values and the command values for the first position, the second position, and the swing angle of the guide roller exceeds the predetermined threshold, determination can be made that the first position, the second position or the swing angle corresponding to the difference exceeding the threshold is not an appropriate position or an appropriate angle. That is, determination can be made that the fiber bundle cannot be guided to the liner by the guide roller continuously.

Therefore, according to the first aspect of the disclosure, since there is a possibility of occurrence of improper winding of the fiber bundle on the liner at an inappropriate position, the controller lowers the winding speed of the fiber bundle. As a result, when the fiber bundle is wound around the liner, it is possible to suppress winding of the fiber bundle at an inappropriate position on the liner in advance.

Furthermore, even when a predetermined response delay to the first position, the second position and the swing angle occurs for each command value, the response delay to the first position, the second position, and the swing angle can be regarded as substantially the same degree, if the difference does not exceed the threshold. Accordingly, it is possible to determine that the guide roller is in an appropriate position and attitude with respect to the rotation angle of the liner, and to wind the fiber around the liner continuously.

Meanwhile, according to the second aspect of the disclosure, when any one of differences between the measured values and the command values of the first position, the second position and the swing angle of the guide roller exceeds the predetermined threshold, there is a possibility of occurrence of improper winding of the fiber bundle on the liner at an inappropriate position. Therefore, the controller calculates the offset time with respect to the command values of the rotation angle of the liner, and the first position, the second position and the swing angle of the guide roller. Then, the controller corrects each command value that is set depending on the elapsed time from the point in time when the difference exceeds the predetermined threshold to each command value that is set after the offset time, and performs control based on the corrected command value.

Therefore, the rotation angle of the liner and the position and attitude of the guide roller can be appropriately adjusted, which makes it possible to wind the fiber bundle around the liner. As a result, when the fiber bundle is wound around the liner, it is possible to suppress the winding of the fiber bundle on the liner at an inappropriate position in advance.

Furthermore, similarly in the second aspect of the disclosure, even when a predetermined response delay to the first position, the second position and the swing angle occurs for each command value, the response delay to the first position, the second position, and the swing angle can be regarded as the same degree, if the difference does not exceed the threshold. In this case, despite the predetermined response delay to the first position, the second position, and swing angle, determination can be made that the guide roller is in an appropriate position and attitude with respect to the rotation angle of the liner. As a result, the fiber bundle can be continuously wound around the liner without correcting the command value by the controller.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a block diagram of a controller of the filament winding device according to the first embodiment;

FIG. 6 is a flowchart illustrating a control method performed by the controller shown in FIG. 5;

DETAILED DESCRIPTION OF EMBODIMENTS

Hereinafter, a first embodiment and a second embodiment, which are each example of the first aspect and the second aspect of the disclosure, will be described with reference to the drawings.

1. Description of Tank 1

Figure 1:
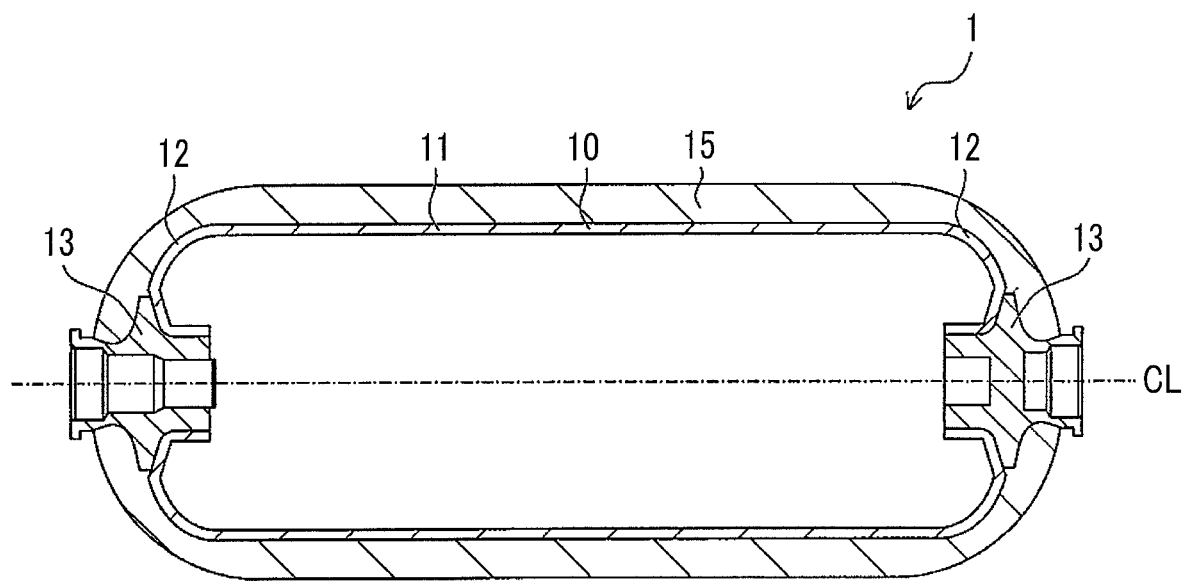
FIG. 1 is a sectional view of a tank manufactured by a filament winding device.

FIG. 1 is a sectional view of a tank 1 manufactured by a filament winding device 100, in which the tank 1 is cut by an imaginary plane passing through the central axis CL.

As shown in FIG. 1, the tank 1 is a gas tank for a fuel cell (hereinafter, referred to as "tank"), and is provided with a liner 10 having a pair of mouthpiece portions 13 and a reinforcing fiber layer 15. The liner 10 is, for example, a hermetically sealed container for containing hydrogen gas to be supplied to the fuel cell, and is provided with a cylindrical body portion 11 and end portions 12 of substantially hemispherical shape (dome shape) formed continuously from both sides of the cylindrical body portion 11. Examples of the material of the liner 10 include aluminum, stainless steel, a resin material and the like.

Each of the mouthpiece portions 13 is made of metal, and provided at the tip of the dome-shaped end portion 12. One mouthpiece portion 13 serves as a pipe when gas is supplied to the liner 10. The reinforcing fiber layer 15 is a layer in which a seamless reinforcing fiber bundle impregnated with a polymer resin (hereinafter, referred to as "fiber bundle") is wound around the liner 10 a plurality of times. Examples of the polymer resin for making the reinforcing fiber layer 15 include a thermoplastic resin, a thermosetting resin, or the like, and in first and second embodiments, the thermosetting resin is used. Meanwhile, the fiber bundle constituting the reinforcing fiber layer 15 is made of carbon fiber or glass fiber. Hereinafter, a filament winding device 100 (hereinafter, referred to as "FW device 100"), which is a device for forming the reinforcing fiber layer 15 will be described.

First Embodiment

2. Description of Device for Manufacturing Tank 1

Figure 2:
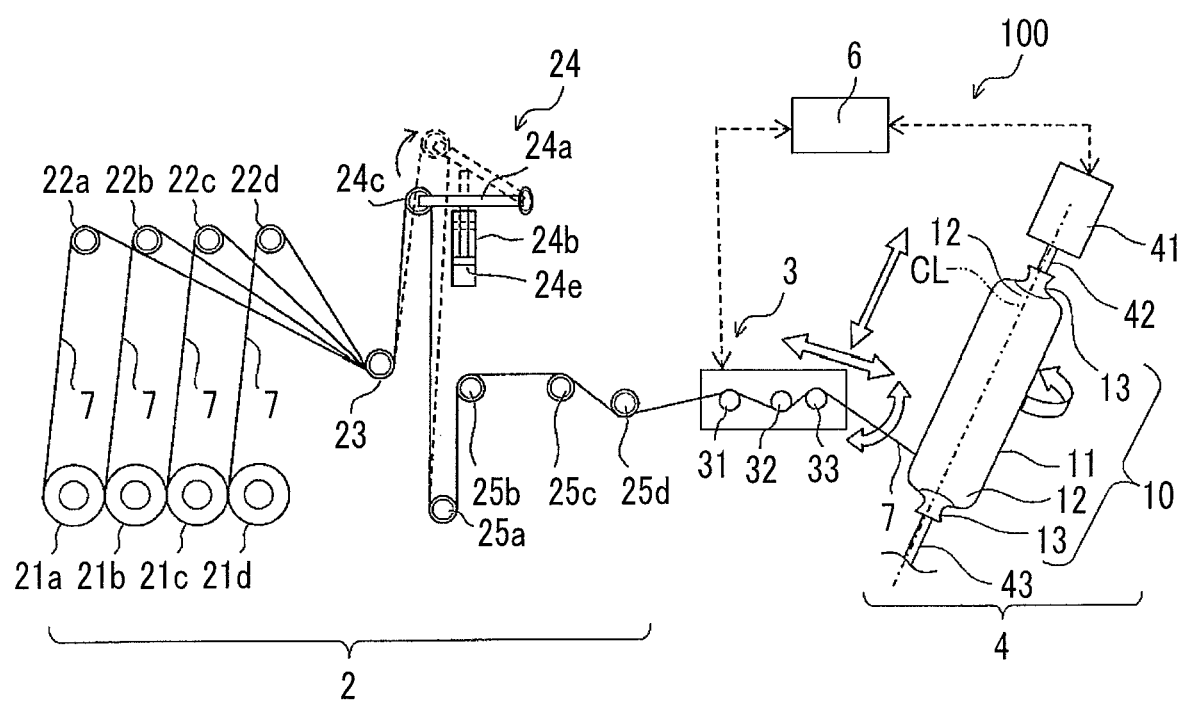
FIG. 2 is a schematic conceptual view of a filament winding device used in a method of manufacturing a tank according to a first embodiment.

FIG. 2 is a schematic conceptual view of a FW device 100 used in a method of manufacturing a tank 1 according to a first embodiment. The FW device 100 includes at least a fiber supplying unit 2, a fiber guide unit 3, a winding unit 4, and a controller 6. The FW device 100 described later is an example of the first aspect of the disclosure, and includes the same components as a FW device 100 of a second embodiment except for the controller 6.

The fiber supplying unit 2 includes a plurality of bobbins 21a to 21d, a plurality of transport rollers 22a to 22d, 25a to 25d, a binding roller 23, and a dancer 24, and has a function of unwinding the fiber bundle 7 impregnated with the uncured thermosetting resin. The bobbins 21a to 21d are cylindrical members, around which the fiber bundle 7 is wound, and is rotationally driven by the drive of an electric motor (not shown) to unwind the fiber bundle 7.

The transport rollers 22a to 22d are provided corresponding to the respective bobbins 21a to 21d to transport the fiber bundle 7 unwound from the bobbins 21a to 21d to the binding roller 23. The binding roller 23 aligns the fiber bundle 7 unwind from the bobbins 21a to 21d, and unwinds the fiber bundle 7 to the dancer 24, which serves as a tension applying device.

The dancer 24 includes a dancer arm 24a, a cylinder 24b, and a dancer roller 24c, and has a function of applying tension to the fiber bundle 7 to be wound around the liner 10. The dancer roller 24c is rotatably provided to one end of the dancer arm 24a, and the fiber bundle 7 is wound around the dancer roller 24c so as to be caught. The cylinder 24b includes a piston 24e connected to the dancer arm 24a. In the dancer 24, the dancer arm 24a is rotated by moving the piston 24e with an adjusting device (not shown) that adjusts the pressure supplied to the cylinder 24b. With the result of the rotation, the tension of the fiber bundle 7 can be adjusted. The fiber bundle 7 delivered from the dancer 24 passes through transport rollers 25a to 25d, and is delivered to a fiber guide unit 3.

The fiber guide unit 3 has a function of aligning and guiding the fiber bundle 7 to the liner 10, and includes first, second and third guide rollers 31, 32, 33. In the first embodiment, the fiber bundle 7 enters from first guide roller 31 side, and contacts the upper outer circumference of the first guide roller 31, and the lower outer circumference of the second guide roller 32, and the upper outer circumference of the third guide roller 33 to be guided to the liner 10. In the disclosure, "guide roller" is an example of the third guide roller 33.

Figure 3:
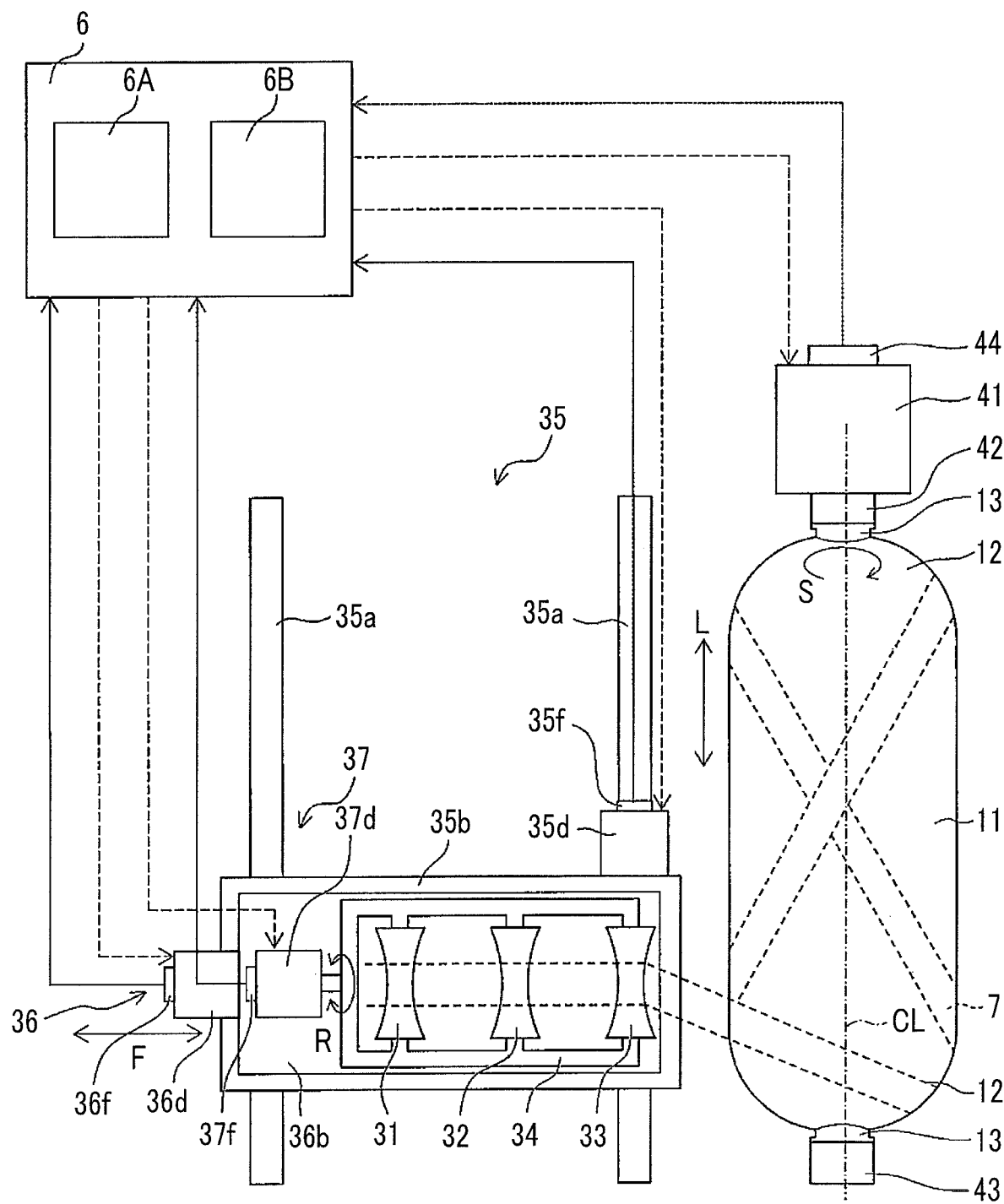
FIG. 3 is a schematic conceptual view of a fiber guide unit of the filament winding device.
Figure 4A:
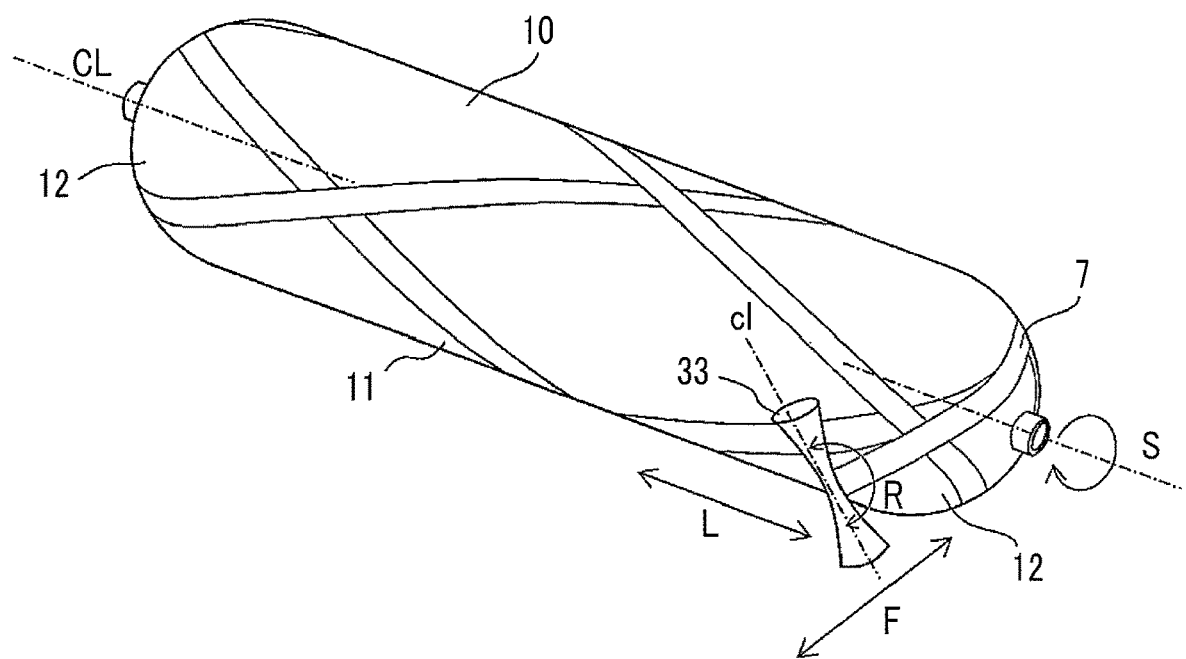
FIG. 4A is a schematic conceptual view of describing operations of a liner and a guide roller (third guide roller)
Figure 4B:
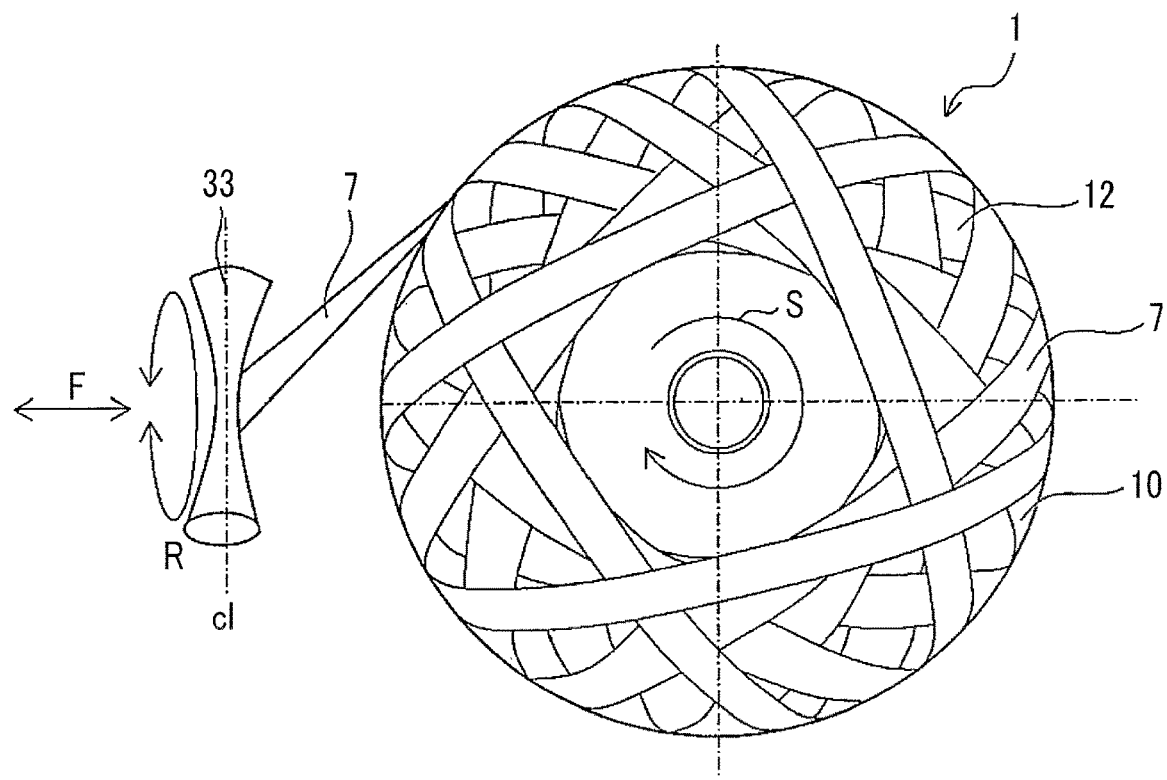
FIG. 4B is a schematic side view of describing operations of the liner and the guide roller (third guide roller)

FIG. 3 is a schematic conceptual view of the fiber guide unit 3 and the winding unit 4 of the FW device 100. FIG. 4A is a schematic conceptual view of describing operations of the liner 10 and the third guide roller 33, and FIG. 4B is a schematic side view of describing operations of the liner 10 and the third guide roller 33. FIG. 4B shows a state in which more fiber bundle 7 is wound around the liner 10 than FIG. 4A.

In the first embodiment, as shown in FIG. 3, the fiber guide unit 3 includes a holding unit 34 that holds the positional relationship among the first, second and third guide rollers 31, 32, 33 and supports the first, second and third guide rollers 31, 32, 33. The fiber guide unit 3 further includes a first moving unit 35, a second moving unit 36 and a swing unit 37.

The first moving unit 35 moves the first, second, and third guide rollers 31, 32, 33 in an axial direction L of the liner 10. The first moving unit 35 includes a pair of rails 35a juxtaposed along the axial direction L of the liner 10, and a first base 35b running on the rails 35a.

On the first base 35b, the holding unit 34 is placed together with the first, second, and third guide rollers 31, 32, 33 through a second base 36b described later. The first base 35b is equipped with a motor 35d, and can be moved on the rails 35a by the rotation of the motor 35d. The mechanism is a general mechanism used as a well-known linear guide. With the mechanism, the first base 35b, the first, second, and third guide roller 31, 32, 33 placed through the first base 35b and the second base 36b can move in the axial direction L of the liner 10.

The motor 35d is equipped with a first measuring unit 35f including a sensor such as an encoder. The controller 6 can measure the position (first position) of the third guide roller 33 with respect to the liner 10 in the axial direction L of the liner 10, by a signal output from the first measuring unit 35f.

The second moving unit 36 moves the first, second, and third guide rollers 31, 32, 33 in a radial direction (front-rear direction) F of the liner 10. The second moving unit 36 includes the second base 36b on which the first, second, and third guide rollers 31, 32, 33 are placed together with the holding unit 34, and the second base 36b is attached to the first base 35b through a well-known rotation-linear motion conversion mechanism (not shown). The rotation-linear motion conversion mechanism includes a motor 36d, and the second base 36b can move in the radial direction F of the liner 10 by the rotation of the motor 36d.

The motor 36d is equipped with a second measuring unit 36f including a sensor such as an encoder. The controller 6 can measure the position (second position) of the third guide roller 33 with respect to the liner 10 in the radial direction F of the liner 10, by a signal output from the second measuring unit 36f.

The swing unit 37 rotates the third guide roller 33 in a rotating direction R such that the central axis cl of the third guide roller 33 swings. Specifically, the swing unit 37 is equipped with a motor 37d attached to the holding unit 34. In the first embodiment, since the first, second, and third guide roller 31, 32, 33 are held by the holding unit 34, the first, second, and third guide rollers 31, 32, 33 swing integrally by the rotation of the motor 37d.

The swing angle measuring unit 37f including a sensor, such as an encoder is attached to the motor 37d, and the controller 6 measures the swing angle of the third guide roller 33 by a signal output from the swing angle measuring unit 37f.

As shown in FIGS. 1 to 3, the winding unit 4 has a function of winding the fiber bundle 7 around the liner 10 by rotating the liner 10. The winding unit 4 includes a rotating unit 41 such as a motor for rotating the liner 10, a rotating rod 42, and a support rod 43.

One end of the rotating rod 42 is fixed to the rotating unit 41, and the other end is fixed to one mouthpiece portion 13. The support rod 43 supports the liner 10 through the other mouthpiece portion 13. When the rotating unit 41 operates, the rotating rod 42 rotates, and thus the liner 10 rotates in one direction (rotation direction S) around the longitudinal central axis CL of the liner 10, which makes it possible to wind the fiber bundle 7 around the liner 10. Therefore, the seamless fiber bundle 7 is wound around the outer circumferential surface of the liner 10, for example, in combination with a hoop winding or a helical winding.

A rotation angle measuring unit 44 including a sensor such as an encoder is attached to the rotating unit 41. The controller 6 measures the rotation angle of the liner 10 by a signal output from the rotation angle measuring unit 44.

In the first embodiment, since the first, second, and third guide roller 31, 32, 33 are integrally held by the holding unit 34, the first, second, and third guide rollers 31, 32, 33 are rotated and moved by the first moving unit 35, the second moving unit 36, and the swing unit 37. However, a configuration in which just one roller, namely, the third guide roller 33 moves and rotates may be implemented such that the third guide roller 33 guides the fiber bundle 7 wound around the liner 10.

The controller 6 controls rotation of the liner 10 by the rotating unit 41, the movement of the third guide roller 33 by the first moving unit 35 and the second moving unit 36, and the rotation of the third guide roller 33 by the swing unit 37. Specifically, the controller 6 outputs control signals to control each of the rotating unit 41, the first moving unit 35, the second moving unit 36, and the swing unit 37 to control above-mentioned units, which makes it possible to wind the fiber bundle 7 around the liner 10 by helical winding as shown in FIGS. 4A and 4B, for example.

The controller 6 includes at least a storage device 6A and a computing device 6B as hardware. The storage device 6A is made up of a ROM, a RAM, or the like for storing winding conditions, thresholds described later, or the like. The computing device 6B includes of a CPU, or the like, which outputs control signals from winding conditions of the storage devices 6A, the rotation angle of the liner 10, and measured values of the first position, the second position, and the swing angle of the third guide roller 33.

The storage device 6A stores each command value for the rotation angle of the liner 10, and the first position, the second position, and the swing angle of the third guide roller 33, which is set depending on the elapsed time from the start of winding the fiber bundle 7 to the end of winding the fiber bundle 7.

FIG. 5 is a block diagram of the controller 6 of the filament winding device 100 according to the first embodiment. As shown in FIG. 5, the controller 6 includes, as software, a command value setting unit 61, an associating unit 62, a difference calculating unit 63, a determination unit 64, a control performing unit 65, and a speed lowering unit 66. The command value setting unit 61 is a part stored in the storage device 6A, and other units are programs computed by the computing device 6B.

The command value setting unit 61 sets command values that is input from an input device (not shown). Specifically, the command values of the rotation angle of the liner 10, and the first position, the second position, and the swing angle of the third guide roller 33 are set depending on the elapsed time from the start of the winding of the fiber bundle 7. Since the command values of the rotation angle of the liner 10, and the first position, the second position, and the swing angle of the third guide roller 33 are set depending on the elapsed time, the rotating unit 41, the first moving unit 35 and the second moving unit 36, and the swing unit 37 are controlled by the control performing unit 65 described later, with the command values as target values. Accordingly, it is possible to form the reinforcing fiber layer 15 by winding the fiber bundle 7 around liner 10 in a desired winding state.

The associating unit 62 associates the measured values of the first position, the second position and the swing angle of the third guide roller 33, corresponding to each rotation angle of the liner 10, with the measured value of the rotation angle of the liner 10. Specifically, the rotation angle of liner 10 measured by the rotation angle measuring unit 44, the first position and the second position of the third guide roller 33 measured by the first measuring unit 35f and the second measuring unit 36f, and the swing angle of the third guide roller 33 measured by the swing angle measuring unit 37f are input. Then, the measured values of the first position, the second position, and the swing angle of the third guide roller 33 are associated with the measured value of the rotation angle of the liner 10.

Figure 7:
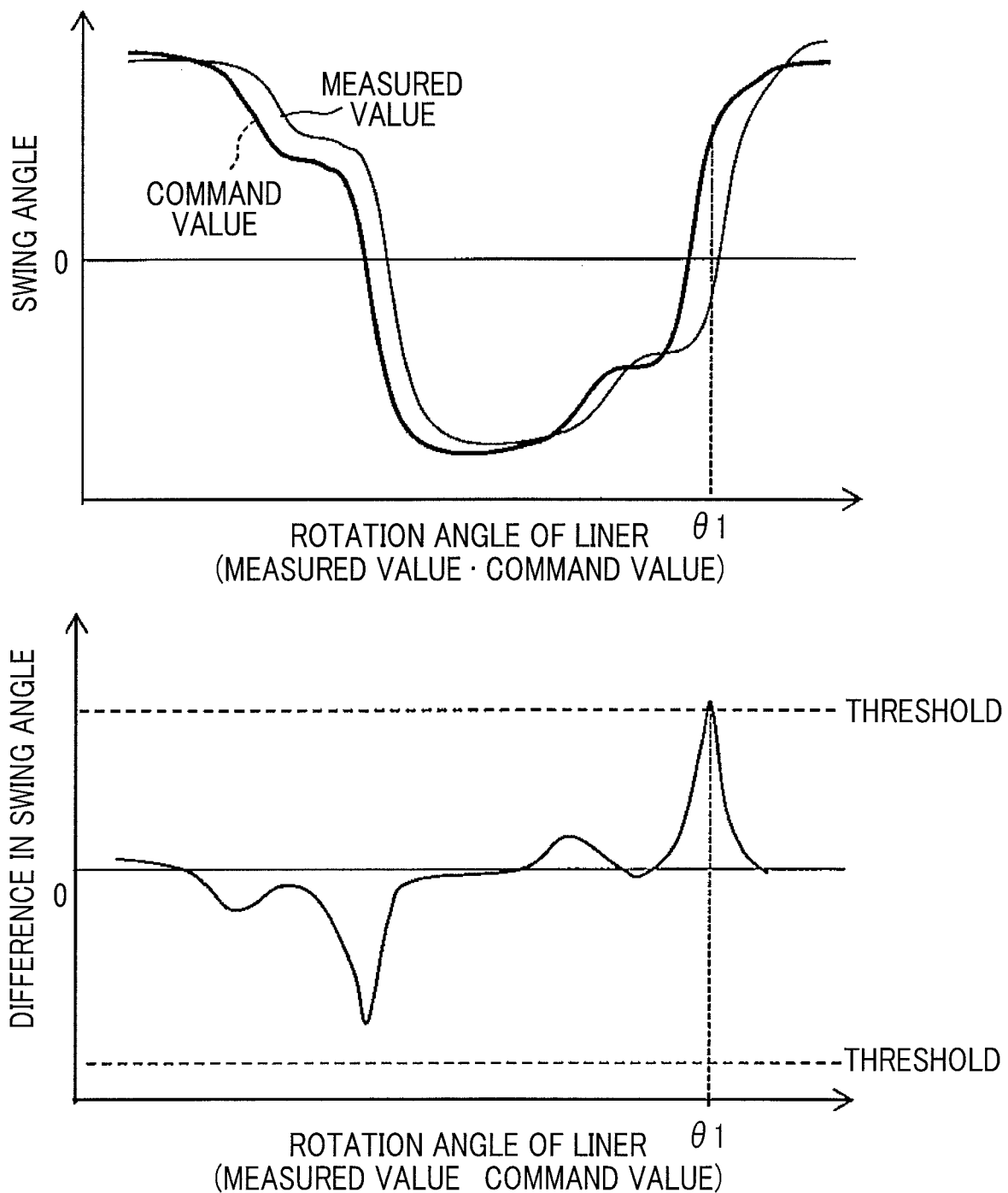
FIG. 7 is a diagram showing a relationship between a swing angle and a difference in the swing angle, with respect to a rotation angle of the liner.

In this way, the relationship between the measured value of the rotation angle of the liner 10 and the measured values of the first position and the second position of the third guide roller 33 can be obtained, and the relationship between the measured value of the rotation angle of the liner 10 and the measured value of the swing angle of the third guide roller 33 can be obtained (see the graph of the measured values in the upper diagram of FIG. 7). The rotation angle of the liner 10 continuously increases with rotation as the rotation angle of the liner 10 at the beginning of the winding of the fiber bundle 7 is set to be zero degree.

While the liner 10 is rotating, the command values of the first position, the second position and the swing angle of the third guide rollers 33, corresponding to each rotation angle of the liner 10, are associated with the command value of each rotation angle of the liner 10. Specifically, the associating unit 62 receives the command value that is set by the command value setting unit 61, and performs the above-mentioned association based on the input command value.

In this way, the relationship between the command value of the rotation angle of the liner 10 and the command values of the first position and the second position of the third guide roller 33 can be obtained, and the relationship between the command value of the rotation angle of the liner 10 and the command value of the swing angle of the third guide roller 33 can be obtained (see the graph of the command values in the upper diagram of FIG. 7). Here, the association of the command value is not performed by the associating unit 62, and the command value associated in advance may be input from an input device (not shown) and stored in the controller 6.

The difference calculating unit 63 calculates the difference between the measured values and the command values of the first position, the second position, and the swing angle of the third guide roller 33, corresponding to each rotation angle of the liner 10, from the measured values and the command values of the third guide roller 33, corresponding to each rotation angle of the liner 10, and associated by the associating unit 62. Specifically, in the first embodiment, the measured value is subtracted from the command value. As a result, the difference in the first position and the second position of the third guide roller 33 corresponding to the rotation angle of the liner 10 and the difference in the swing angle of the third guide roller 33 corresponding to the rotation angle of the liner 10 can be obtained (see the graph in the upper diagram of FIG. 7).

For example, when the difference between the measured values and the command values of the first position, the second position, or the swing angle of the third guide roller 33 is large at a predetermined rotation angle of the liner 10, it can be said that the third guide roller 33 does not reach the appropriate first position, the appropriate second position, or the appropriate swing angle with respect to the predetermined rotation angle of the liner 10 due to response delay at the rotation angle of the liner 10.

On the other hand, even if there is a uniform response delay to the rotation angle of the liner 10, and the first position, the second position, and the swing angle of the third guide roller 33, the first position, the second position and the swing angle of the third guide roller 33 are appropriate with respect to the rotation angle of the liner 10. In this case, the difference described above is a small value. Therefore, a determination unit 64 described below determines whether the third guide roller 33 is disposed at appropriate positions and at an appropriate swing angle with respect to the rotation angle of the liner 10.

The determination unit 64 determines whether or not any one of the differences between the measured values and the command values of the appropriate positions and the swing angle of the third guide roller 33, which are calculated by the difference calculating unit 63, exceeds a predetermined threshold. Here, the threshold of the first position, the second position, and the swing angle of the third guide roller 33 are set to values at which winding deviation of the fiber bundle 7 occur when any one the aforementioned differences exceeds the threshold.

When the determination unit 64 determines that any of the differences does not exceed the predetermined threshold, the control performing unit 65 outputs control signals to the rotating unit 41, the first moving unit 35 and the second moving unit 36, and the swing unit 37 with the set command values as target values, and performs controls on the above-mentioned units. Accordingly, it is possible to control the winding of the fiber bundle 7 on the liner 10 based on the command value.

When any one of the differences exceeds the predetermined threshold, the speed lowering unit 66 performs control of lowering the speed of the winding of the fiber bundle 7 performed by the control performing unit 65. Specifically, the speed lowering unit 66 lowers the rotational speed of the liner 10 caused by the rotating unit 41, the moving speed of the third guide roller 33 caused by the first moving unit 35 and the second moving unit 36, and the rotational speed of the third guide roller 33 caused by the swing unit 37. The speed of the winding of the fiber bundle 7 may be lowered until the winding of the fiber bundle 7 is completely stopped in the first embodiment. However, the winding of the fiber bundle 7 may be resumed under the control of the control performing unit 65 at a point in time when the difference does not exceed the predetermined threshold.

Hereinafter, a control method performed by the controller 6 according to the first embodiment. FIG. 6 is a flowchart illustrating the control method performed by the controller shown in FIG. 5. FIG. 7 is a diagram showing a relationship between the swing angles and the difference in the swing angle, with respect to the rotation angle of the liner.

First, as shown in FIG. 6, in step S61, the liner 10 is rotated and the third guide roller 33 is moved and rotated by the control performing unit 65 based on the command values that are set by the command value setting unit 61. That is, at this point in time, determination may be made by the determination unit 64.

Then, in step S62, the rotation angle of the liner 10 that is rotated, and the first position, the second position, and the swing angle of the third guide roller 33 that is moving and rotating are measured. The measured values are input into the associating unit 62 and the method proceeds to step S63. The method may proceed to step S63 by performing steps S61 and S62 until measured values that can be associated, which will be described later, are measured.

Then, in step S63, the associating unit 62 associates the measured values of the first position, the second position, and the swing angle of the third guide roller 33 corresponding to each rotation angle of the liner 10 with the measured value of the rotation angle of the liner 10. At the same time, the command values of the first position, the second position, and the swing angle of the third guide roller 33 corresponding to each rotation angle of the liner 10 are associated with the command value of each rotation angle of the liner 10.

As a result, as described above, the relationship between the command value and the measured value of the first position and the second position of the third guide roller 33 with respect to the rotation angle of the liner 10, and the relationship between the command value and the measured value of the swing angle of the third guide roller 33 can be also obtained (see the graph of the command value of the upper portion of FIG. 7).

Then, in step S64, the difference calculating unit 63 calculates differences between the measured values and the command values of the first position, the second position, and the swing angle of the third guide roller 33 corresponding to each rotation angle of the liner 10, from the measured values and the command values of the third guide roller 33 corresponding to each rotation angle of the liner 10.

Then, in step S65, the determination unit 64 determines whether any one of the differences between the measured values and the command values of the first position, the second position, and the swing angle of the third guide roller 33, which are calculated by the difference calculating unit 63 exceeds the predetermined threshold. Here, when any of the differences does not exceed the predetermined threshold, the method proceeds to step S66, and determination is made whether there is an instruction to end the winding. When there is no instruction to end the winding, the method returns to step S61. On the other hand, in step S66, when there is the instruction to end the winding, the winding is ended.

In step S65, when any one of the differences between the measured values and the command values of the first position, the second position, and the swing angle of the third guide roller 33 exceeds the threshold, the method proceeds to step S67. For example, in the lower portion of FIG. 7, the rotation angle of the liner 10 is θ1, and the difference in the swing angle exceeds the predetermined. In step S67, the speed lowering unit 66 lowers the rotational speed of the liner 10 caused by the rotating unit 41, the moving speed of the third guide roller 33 caused by the first moving unit 35 and the second moving unit 36, and the rotational speed of the third guide roller 33 caused by the swing unit 37 until the winding of the fiber bundle 7 is completely stopped.

According to the first embodiment, when any one of the differences exceeds the predetermined threshold, determination can be made that the first position and the second position or the swing angle corresponding to the difference exceeding the threshold are or is not in the appropriate position or the appropriate angle. That is, determination is made that the fiber bundle cannot be continuously guided to the liner by the third guide roller 33.

Therefore, since there is a possibility of occurrence of improper winding of the fiber bundle 7 on the liner 10 at an inappropriate position, the controller 6 lowers the speed of the winding of the fiber bundle. As a result, when the fiber bundle 7 is wound around the liner 10, it is possible to suppress occurrence of improper winding of the fiber bundle 7 at an inappropriate position on the liner 10.

Even when a predetermined response delay to the first position, the second position and the swing angle occurs for each command value, the response delay to the first position, the second position and the swing angle can be regarded as substantially the same degree, if the difference does not exceed the threshold. Accordingly, determination is made that the third guide roller 33 is in an appropriate position and attitude with respect to the rotation angle of the liner 10, and thus continued winding of the fiber around the liner can be performed.

Second Embodiment

Figure 8:
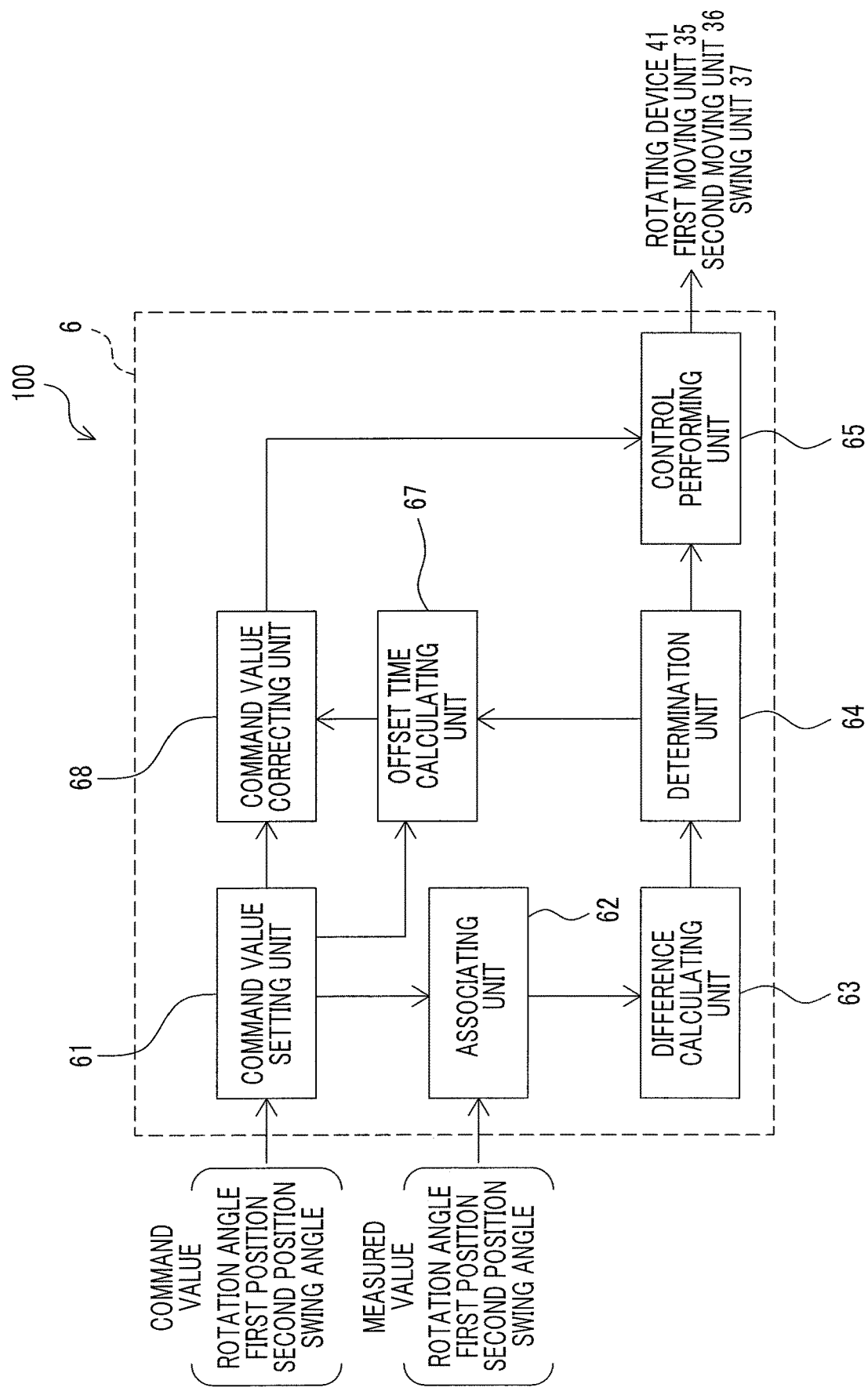
FIG. 8 a block diagram of a controller of a filament winding device according to a second embodiment.
Figure 9:
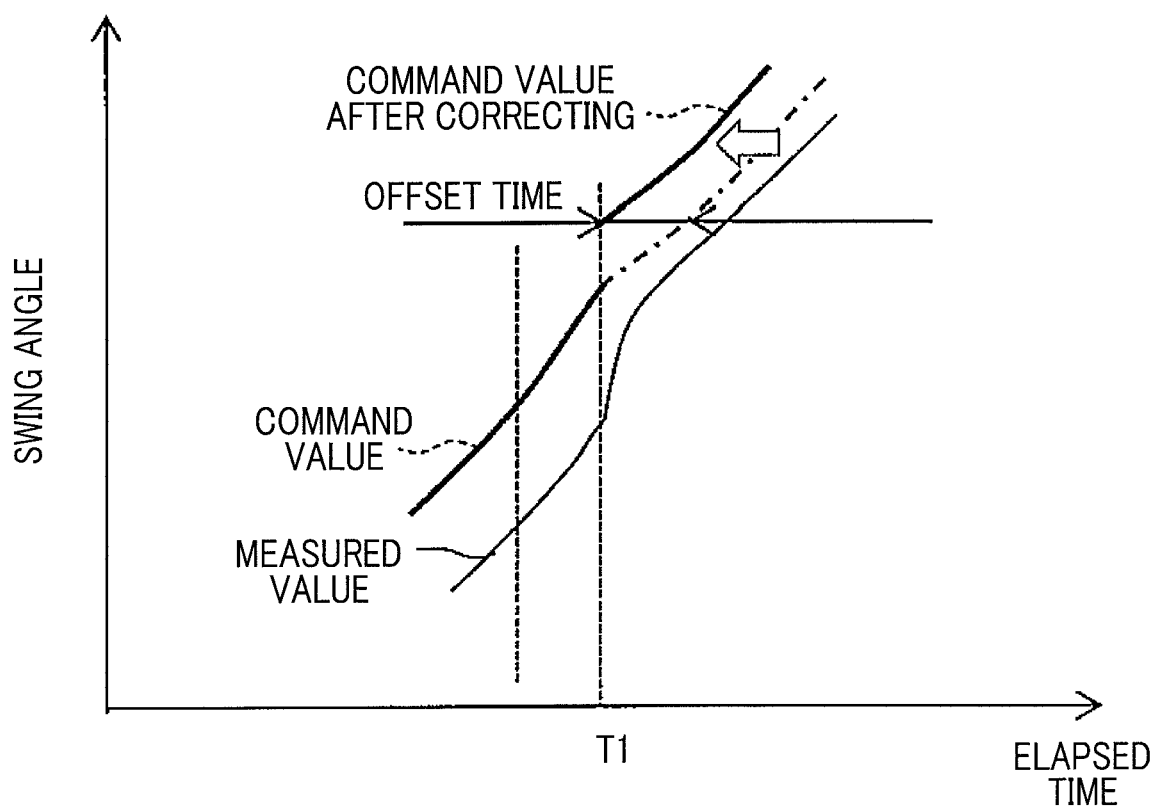
FIG. 9 is a graph illustrating calculation and correction performed by an offset time calculating unit and a command value correcting unit shown in FIG. 8, respectively.

FIG. 8 a block diagram of a controller 6 of an FW device 100 according to a second embodiment. FIG. 9 is a graph illustrating calculation and correction performed by an offset time calculating unit 67 and a command value correcting unit 68 shown in FIG. 8, respectively. The FW device 100 of the second embodiment is an example of the second aspect of the disclosure, and has the same configuration as the FW device 100 of the first embodiment except the controller 6. Therefore, description of the same components will not be repeated, and merely the difference will be described below.

The FW device 100 according to the second embodiment includes an offset time calculating unit 67 and a command value correcting unit 68 in place of the speed lowering unit 66. When the determination unit 64 determines that any one of differences exceeds the predetermined threshold, the offset time calculating unit 67 calculates the offset time with regard to the rotation angle of the liner 10, and the command values of the first position and the second position and the swing angle of the third guide roller 33 based on the any one of differences exceeding the threshold.

More specifically, the offset time calculating unit 67 calculates the offset time such that the command value corresponding to an elapsed time from a predetermined start of winding is controlled in a feedforward control manner. For example, as shown in FIG. 9, in a point in time T1 when the difference in the swing angle of the third guide roller 33 exceeds the predetermined threshold, the offset time is calculated based on the difference in the swing angle at the point in time T1 (the difference calculated by the difference calculating unit 63). The offset time is the time in which the difference is theoretically within a predetermined range when the command value that is set is input after the offset time. The time described above may be experimentally obtained from the relationship between the rotation angle of the liner and the magnitude of the difference before and after correction to be described later, for example.

The command value correcting unit 68 corrects the command values of the first position, the second position, and the swing angle of the third guide roller 33, which is set depending on the elapsed time from the point in time when the predetermined threshold is exceeded, to each command value that is set after the offset time, and update of the command values with the command values after correction is performed. For example, as shown in FIG. 9, when the difference in the swing angle of the third guide roller 33 exceeds the predetermined threshold, the command value of the swing angle at the point in time T1 is corrected to each command value that is set after the offset time. Furthermore, the command values of the first position and the second position of the third guide roller 33 are also corrected to command values that are set after offset time.

Figure 10:
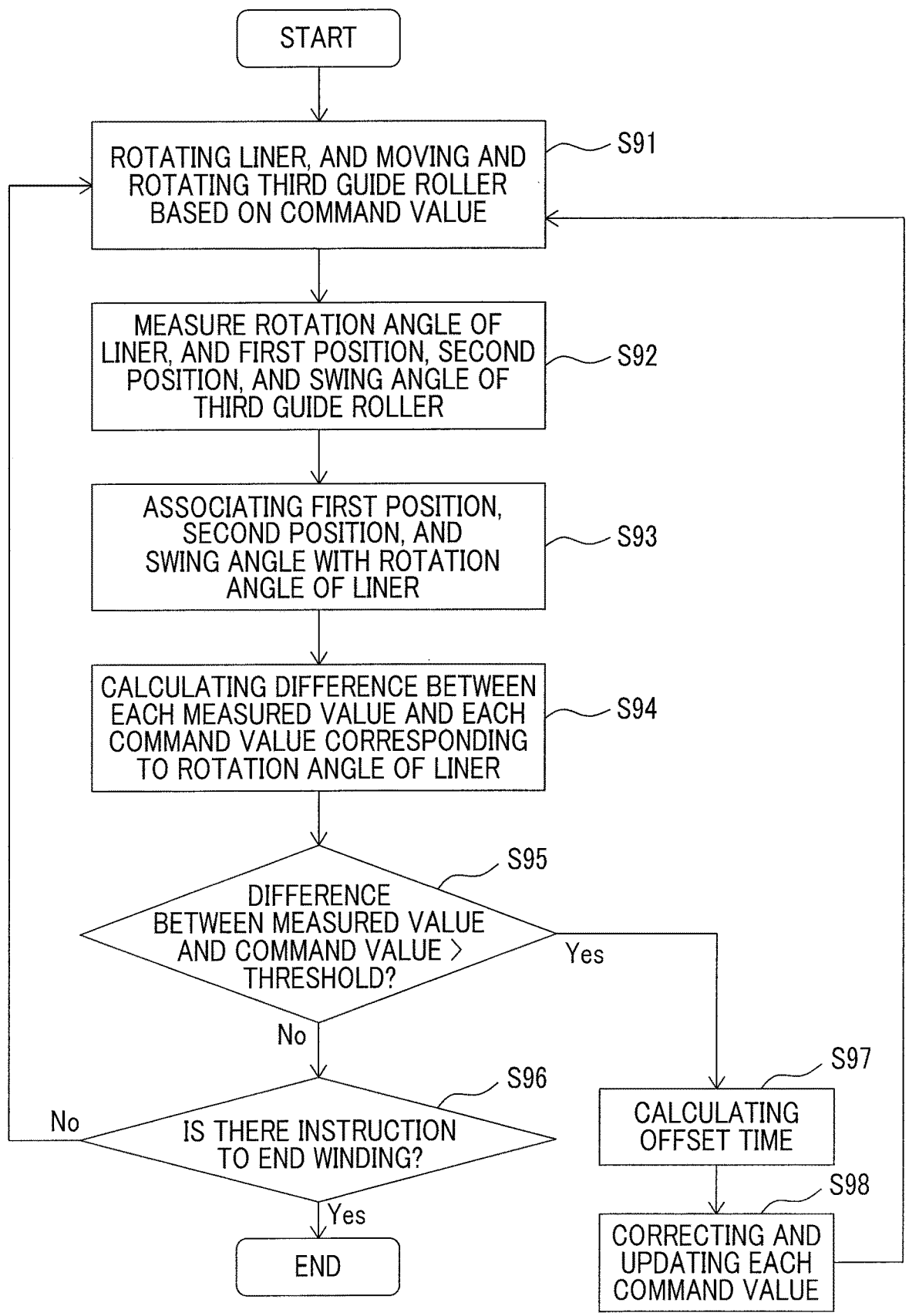
FIG. 10 is a flowchart illustrating a control method performed by a controller shown in FIG. 8.

Hereinafter, a control method performed by the controller 6 according to the second embodiment will be described. FIG. 10 is a flowchart illustrating the control method performed by the controller 6 shown in FIG. 8. In the flowchart shown in FIG. 10, steps S91 to S96 are the same as steps S61 to S66 shown in FIG. 6, respectively. Therefore, the description thereof will be omitted, and the subsequent steps will be described.

More specifically, in step S95, when any one of the differences calculated in step S94 exceeds the predetermined threshold in step S97, the offset time is calculated by the offset time calculating unit 67, and the method proceeds to step S98. In step S98, the command values of the first position, the second position, and the swing angle of the third guide roller 33 are also corrected to the command values that are set after the offset time by the command value correcting unit 68, and update of the command values with the corrected command values is performed.

In step S98, when the command values of the first position, the second position and the swing angle of the third guide roller 33 are updated, the method proceeds to step S91, and control on the winding of the fiber bundle 7 is performed based on the updated command values.

When any one of the differences calculated by the difference calculating unit 63 exceeds the predetermined threshold, there is a possibility of occurrence of improper winding of the fiber bundle 7 on the liner 10 at an inappropriate position. Therefore, in the second embodiment, the controller 6 performs the feedforward control as described above, which makes it possible to adjust the rotation angle of the liner 10 and the position and attitude of the third guide roller 33 to an appropriate state with respect to the rotation angle of the liner 10, and makes it possible to wind the fiber bundle 7 at an appropriate position. As a result, when the fiber bundle 7 is wound around the liner 10, it is possible to suppress occurrence of improper winding of the fiber bundle 7 at an inappropriate position on the liner 10.

Even when a predetermined response delay to the first position, the second position and the swing angle occurs for each command value, the response delay to the first position, the second position and the swing angle can be regarded as substantially the same degree, if the difference does not exceed the threshold. Therefore, even when there is a predetermined response delay to the first position, the second position, and the swing angle, determination is made that the third guide roller 33 is in an appropriate position and attitude with respect to the rotation angle of the liner 10, and thus continued winding of the fiber around the liner 10 can be performed. As a result, the fiber bundle 7 can be continuously wound around the liner 10 without correcting the command value by the controller 6.

Although the embodiments of the disclosure have been described in detail above, the disclosure is not limited to the embodiments described above, and various design changes can be made without departing from the spirit of the disclosure described in the claims.

What is claimed is:

1. A filament winding device that winds a fiber bundle around a liner including a cylindrical body portion and a pair of dome-shaped end portions formed at both sides of the body portion, the filament winding device comprising:
   a rotating unit configured to rotate the liner about a central axis of the liner;
   a guide roller configured to guide the fiber bundle wound around the liner;
   a first moving unit configured to move the guide roller in an axial direction of the liner;
   a second moving unit configured to move the guide roller in a radial direction of the liner;
   a swing unit configured to rotate the guide roller such that a central axis of the guide roller swings;
   a rotation angle measuring unit configured to measure a rotation angle of the liner;
   a first measuring unit configured to measure a first position of the guide roller in the axial direction;

a second measuring unit configured to measure a second position of the guide roller in the radial direction;
a swing angle measuring unit configured to measure a swing angle of the guide roller; and
a controller configured to control the rotating unit, the first moving unit, the second moving unit, and the swing unit, based on each of command values of the rotation angle of the liner, and the first position, the second position, and the swing angle of the guide roller, the command values being set depending on an elapsed time from a start of a winding of the fiber bundle,
wherein the controller is configured to include
an associating unit configured to associate measured values of the first position, the second position, and the swing angle of the guide roller, corresponding to each rotation angle of the liner, with a measured value of the rotation angle of the liner,
a difference calculating unit configured to calculate differences between the command values of the first position, the second position, and the swing angle of the guide roller and the measured values of the first position, the second position, and the swing angle of the guide roller corresponding to the rotation angle of the liner, based on the measured values of the guide roller associated with the rotation angle of the liner and the command values of the guide roller, corresponding to each command value of the rotation angle of the liner, and
a speed lowering unit configured to, when any one of the differences exceeds a predetermined threshold, lower a winding speed of the fiber bundle on the liner by lowering a rotational speed of the liner by the rotating unit, a moving speed of the guide roller by the first moving unit and the second moving unit, and a rotational speed of the guide roller by the swing unit.

2. A filament winding device that winds a fiber bundle around a liner including a cylindrical body portion and a pair of dome-shaped end portions formed at both sides of the body portion, the filament winding device comprising:
a rotating unit configured to rotate the liner about a central axis of the liner;
a guide roller configured to guide the fiber bundle wound around the liner;
a first moving unit configured to move the guide roller in an axial direction of the liner;
a second moving unit configured to move the guide roller in a radial direction of the liner;
a swing unit configured to rotate the guide roller such that a central axis of the guide roller swings;
a rotation angle measuring unit configured to measure a rotation angle of the liner;
a first measuring unit configured to measure a first position of the guide roller in the axial direction;
a second measuring unit configured to measure a second position of the guide roller in the radial direction;
a swing angle measuring unit configured to measure a swing angle of the guide roller; and
a controller configured to control the rotating unit, the first moving unit, the second moving unit, and the swing unit, based on each of command values of the rotation angle of the liner, and the first position, the second position, and the swing angle of the guide roller, the command values being set depending on an elapsed time from a start of a winding of the fiber bundle, wherein:
the controller is configured to include
an associating unit configured to associate measured values of the first position, the second position, and the swing angle of the guide roller, corresponding to each rotation angle of the liner, with a measured value of the rotation angle of the liner,
a difference calculating unit configured to calculate differences between the command values of the first position, the second position, and the swing angle of the guide roller and the measured values of the first position, the second position, and the swing angle of the guide roller corresponding to the rotation angle of the liner, based on the measured values of the guide roller associated with the rotation angle of the liner and the command values of the guide roller, corresponding to each command value of the rotation angle of the liner,
an offset time calculating unit configured to, when any one of the differences exceeds a predetermined threshold, calculate an offset time with respect to the command values of the rotational angle of the liner, the first position, the second position, and the swing angle of the guide roller, based on the difference exceeding the threshold, and
a correcting unit configured to correct the command values that are set depending on an elapsed time since a point in time when the difference exceeds the threshold, to the command values that are set after the offset time; and
the controller is configured to perform the control based on the command value after correcting the command values.

* * * * *